Dec. 21, 1926.  
H. R. RODEWALD  
1,611,320  
ADJUSTABLE HAND CULTIVATOR  
Filed August 20, 1925  
2 Sheets-Sheet 2
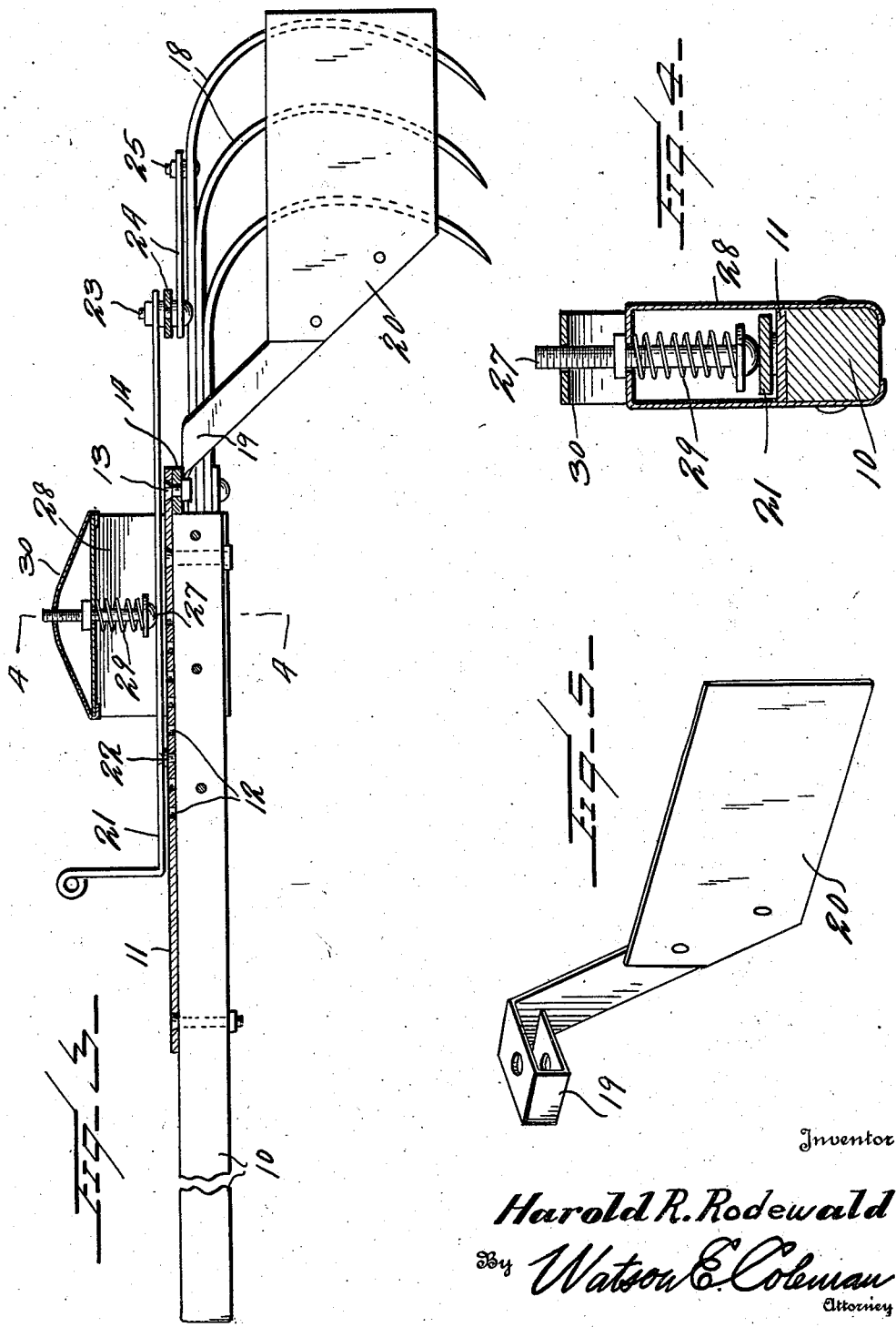
Inventor  
Harold R. Rodewald  
By Watson E. Coleman  
Attorney Patented Dec. 21, 1926.

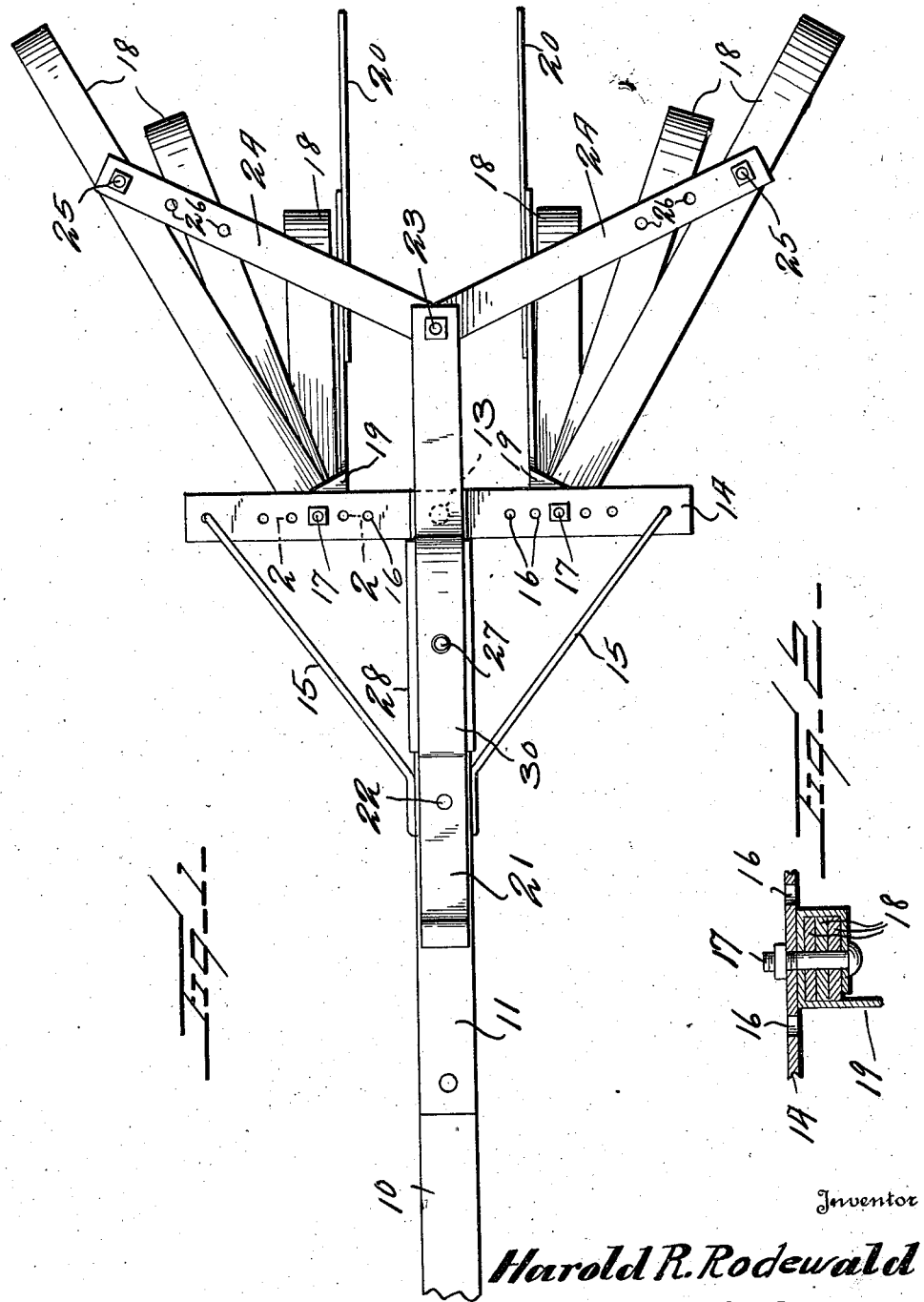

1,611,320

UNITED STATES PATENT OFFICE.

HAROLD RAYMOND RODEWALD, OF ELMWOOD, WISCONSIN.

ADJUSTABLE HAND CULTIVATOR.

Application filed August 20, 1925. Serial No. 51,459.

This invention relates to cultivators designed to be operated by hand and having re-curved teeth to scarify the soil.

The general object of the invention is to provide a hand cultivator of this character in which the teeth are adjustable toward or from each other to thereby increase or decrease the space between the teeth.

A further object is to provide a device of this character having in connection with the teeth projecting shields adapted to be disposed on each side of a row of plants to thereby protect the plants from the action of the teeth and also prevent dirt being thrown up on the plants by the use of the cultivator.

Other objects have to do with the details of construction and arrangement of parts as will appear more fully hereinafter.

My invention is illustrated in the accompanying drawings, wherein:—

Figure 1 is a top plan view of a hand cultivator constructed in accordance with my invention;

Figure 2 is a section on the line 2—2 of Figure 3;

Figure 3 is a side elevation thereof, the plate 11 and allied parts being in section;

Figure 4 is a section on the line 4—4 of Figure 3;

Figure 5 is a perspective view of one of the shields.

Referring to these drawings, 10 designates the handle of the cultivator which, of course, may be of any desired length, and preferably applied to the upper face of this handle and extending rearward beyond the rear end of the handle is an iron 11 or other metallic strip formed with holes 12. This iron 11 may be held to the handle in any suitable manner and at its rear end is connected by a bolt 13 to a transverse bar 14, this bar being connected by forwardly convergent braces 15 to the tongue or handle 10. The transverse bar 14 is provided on each side of the bolt 13 with a plurality of apertures 16, and adapted to be disposed through any one of these apertures are the pivot bolts 17.

Pivotally connected to each pivot bolt are a plurality of re-curved cultivator blades 18, three being shown. These blades are disposed preferably in a convergent relation so that the tips of the blades are out of alignment with each other and held in this relation in any suitable manner, as by the bolt 17. The bolt 17 also passes through the shank 19 of a shield 20 which is somewhat rectangular in form and whose lower edge is adapted to travel upon or slightly beneath the ground. This shield is adapted to move with the three or more blades 18 as these are shifted outward or inward by the mechanism now to be described.

Resting upon the upper face of the handle 10 and movable longitudinally thereon is an adjusting member 21 whose forward end is provided with a downwardly extending tooth or detent 22 adapted to engage in any one of the holes 12. The rear end of this adjusting member 21 is pivotally connected at 23 to two outwardly diverging links 24, each link being pivoted at its outer end, as at 25, to the uppermost blade 18. It will be obvious now that if the adjusting member 21 be shifted rearward, the blades will be oscillated upon their pivot bolts 17 and the rear ends of the blades will be caused to shift away from each other, or if the adjusting member be shifted in the other direction the blades will be shifted toward each other, thus increasing or decreasing the distance between the blades so that the blades will be either parallel to each other or spread apart. Furthermore, it will be obvious that the forward ends of these blades may be shifted toward or from each other by adjusting the pivot bolt 17 in any of the apertures 16 and thus the distance between the forward ends of the blades may be adjusted.

The links 24 are likewise provided with a plurality of perforations 26 and the pivot bolt 25 may be adjusted between any one of these perforations to thereby change the relation of the rear ends of the blades and adjust the rear ends of the blades to suit the adjustment of the forward ends of the blades.

The adjusting member 21 is held in its adjusted position by the pin or tooth 22 engaging in any one of the apertures 12 and this adjusting member is held from accidental upward movement which would disengage the pin 22 from the aperture by means of a spring-pressed plunger 27 which is mounted in the top of a housing 28, this plunger having vertical movement and being urged downward by means of a spring 29. This plunger may be held in its vertical position by an arcuate member 30 having an aperture through which the upper end of the plunger passes. This plunger has a rounded head at its lower end which bears against the upper face of the adjusting member 21 and urges this adjusting member down.

When it is desired to adjust the cultivator teeth, the adjusting member 21 is lifted to detach the pin from its engagement with the aperture 12 and the adjusting member is then shifted forward or rearward, thus spreading apart the blades and shields or drawing them together. It is obvious that any number of blades might be disposed in a gang of blades and that the blades may be adjusted toward or from each other either at their forward ends or rear ends. It is also obvious that the number of blades might be readily changed and the shields either removed or used as desired.

While I have described a form of my invention which I believe to be particularly effective, I do not wish to be limited thereto as it is obvious that many changes might be made therein without departing from the spirit of the invention.

I claim:—

1. A hand cultivator of the character described including a handle having a cross bar at its rear end, a pair of cultivator gangs pivotally mounted upon said cross bar for movement in a horizontal plane, a pair of shields, one for each gang, each shield being pivotally mounted upon the pivotal support for the corresponding gang, and manually operable means carried by the handle whereby the gangs and shields may be spread apart from each other at their rear ends or shifted toward each other.

2. In a cultivating device of the character described, a pair of cultivating members pivotally supported at their forward ends, means for adjusting the rear ends of the cultivating members toward or from each other including a longitudinally movable adjusting member mounted upon the handle, a pair of links pivotally connected to the rear end of said member and to said cultivating members, means for holding the adjusting member in position including a pin on the adjusting member, the handle being provided with sockets for the reception of said pin, a housing carried on the handle and through which the adjusting member passes, and a spring operated plunger disposed in said housing and bearing at its upper end against the upper face of the adjusting member.

In testimony whereof I hereunto affix my signature.

HAROLD RAYMOND RODEWALD.